United States Patent
Hilpert

(10) Patent No.: US 9,062,738 B2
(45) Date of Patent: Jun. 23, 2015

(54) DAMPER

(75) Inventor: Jurgen Benno Hilpert, Frickenhausen (DE)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 136 days.

(21) Appl. No.: 13/636,842

(22) PCT Filed: May 25, 2011

(86) PCT No.: PCT/US2011/037953
§ 371 (c)(1),
(2), (4) Date: Sep. 24, 2012

(87) PCT Pub. No.: WO2011/150095
PCT Pub. Date: Dec. 1, 2011

(65) Prior Publication Data
US 2013/0009352 A1    Jan. 10, 2013

(30) Foreign Application Priority Data
May 26, 2010   (DE) .......................... 10 2010 022 373

(51) Int. Cl.
*F16F 13/00*    (2006.01)
*F16F 9/32*    (2006.01)
*F16F 9/12*    (2006.01)

(52) U.S. Cl.
CPC ................. *F16F 9/3271* (2013.01); *F16F 9/12* (2013.01); *F16F 2230/0041* (2013.01)

(58) Field of Classification Search
CPC ......... F16F 9/0254; F16F 9/12; F16F 9/3271; F16F 2230/0041
USPC ........................................ 188/290, 300, 265
See application file for complete search history.

(56) References Cited

U.S. PATENT DOCUMENTS

| | | | |
|---|---|---|---|
| 4,550,470 A | 11/1985 | Omata | |
| 4,576,252 A | 3/1986 | Omata | |
| 4,796,733 A * | 1/1989 | Nakayama | 188/291 |
| 5,211,269 A | 5/1993 | Ohshima | |
| 5,303,906 A * | 4/1994 | Cotter et al. | 267/64.11 |
| 5,353,688 A * | 10/1994 | Pierce et al. | 92/63 |

(Continued)

FOREIGN PATENT DOCUMENTS

| | | | |
|---|---|---|---|
| CN | 1774584 A | 5/2006 | |
| DE | 3202225 A1 * | 8/1983 | F16B 7/16 |
| EP | 1933058 A2 | 6/2008 | |

OTHER PUBLICATIONS

An International Search Report and Written Opinion, dated Sep. 6, 2011, in International Application No. PCT/US2011/037953.

*Primary Examiner* — Xuan Lan Nguyen
(74) *Attorney, Agent, or Firm* — Lowe Hauptman & Ham LLP

(57) ABSTRACT

Damper for dampening the movement of a component, in particular a component in the interior of an automobile, comprising a damper housing and a damper element being located at least partially within the damper housing and being moveable with regard to the damper housing, and a spring element being in operational connection with the damper element and biasing the damper element in a first moving direction, wherein mechanical locking means are provided which inhibit a movement of the damper element with regard to the damper housing at least in the first moving direction when the spring element is biased, and in that the mechanical locking means are releasable.

24 Claims, 2 Drawing Sheets

(56) References Cited

U.S. PATENT DOCUMENTS

Figure 9:
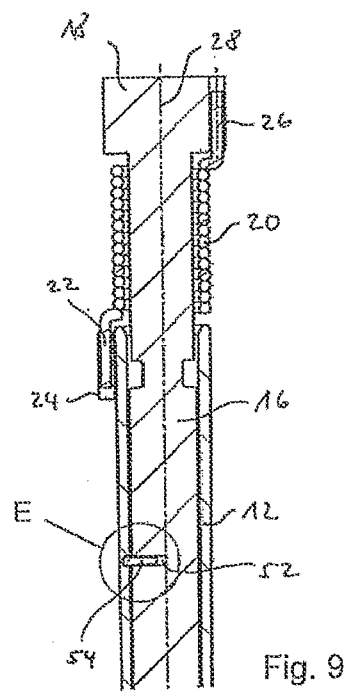

| | | | |
|---|---|---|---|
| 5,875,874 A * | 3/1999 | Okabe et al. | 188/130 |
| 6,086,059 A * | 7/2000 | Runesson et al. | 267/64.11 |
| 6,446,943 B1 * | 9/2002 | Holden | 267/64.12 |
| 6,913,125 B2 * | 7/2005 | Hayashi | 188/290 |
| 6,922,869 B2 * | 8/2005 | Bivens et al. | 16/54 |
| 2005/0183910 A1 * | 8/2005 | Tsai | 188/300 |
| 2006/0237273 A1 * | 10/2006 | Maret | 188/300 |
| 2007/0017757 A1 * | 1/2007 | Schrader et al. | 188/170 |

* cited by examiner

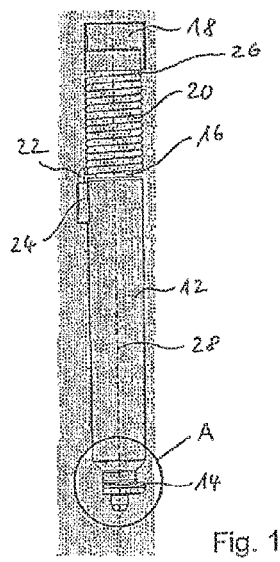
Fig. 1
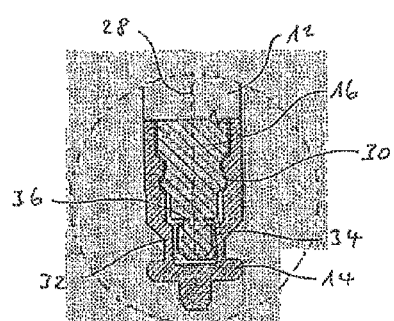
Fig. 2
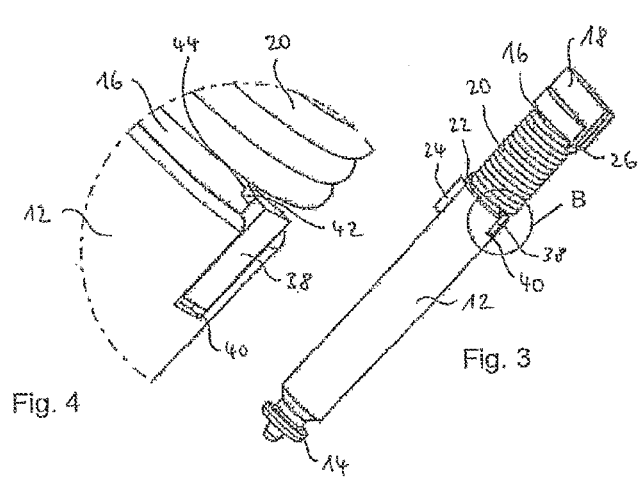
Fig. 3
Fig. 4
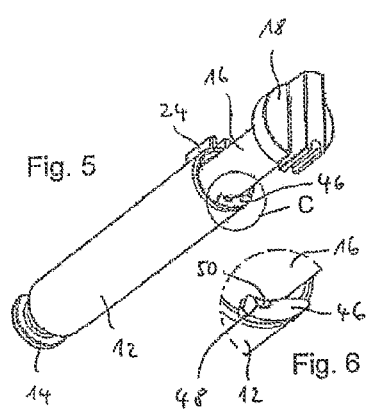
Fig. 5
Fig. 6
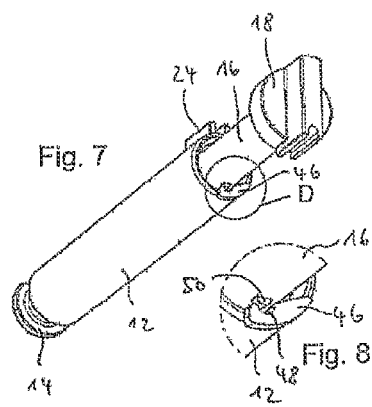
Fig. 7
Fig. 8

DAMPER

RELATED APPLICATIONS

The present application is a National Phase of International Application No. PCT/US2011/037953, filed May 25, 2011 and claims priority from, German Application No. 102010022373.5, filed May 26, 2010.

The present invention relates to a damper for dampening the movement of a component, in particular a component in the interior of an automobile, comprising a damper housing and a damper element being located at least partially within the damper housing and being movable with regard to the damper housing, and a spring element being in operational connection with the damper element and biasing the damper element in a first moving direction.

Dampers of this type are used, for example, for the dampened driving of components in the interior of an automobile, in particular covers, flaps or grab handles. A spring element provides biasing by means of which the component, for example after a lock is released, is moved in a dampened manner in a first direction. The damper housing frequently contains a damper fluid, for example a silicone fluid, in which the damper element moves. Owing to the interaction with the damper fluid, the movement is dampened. Rotational springs are frequently used as the spring element. In order to produce the driving force which is to be exerted on the corresponding component by the spring element in the later use, the spring element has to be biased during the operation to install the damper into or onto the component. Said biasing of the spring during the installation of the damper has to be carried out manually and is associated with a considerable outlay.

Starting from the explained prior art, the invention is therefore based on the object of providing a damper of the type mentioned at the beginning, with which mounting on the component is simplified.

This object is achieved according to the invention by the subject matter of claim 1. Advantageous refinements are found in the dependent claims, the description and the figures.

For a damper of the type mentioned at the beginning, the invention achieves the object in that mechanical locking means are provided which inhibit a movement of the damper element with regard to the damper housing at least in the first moving direction when the spring element is biased, and in that the mechanical locking means are releasable.

The damper may be an axle damper. The damper housing forms a cavity in which the damper element is at least partially located and moves. Movement of the damper element in the installed state of the damper is transferred into a corresponding movement of the component. A damper medium, in particular a damper fluid, for example a silicone fluid, can be provided in the cavity. Movement of the damper element in a damper fluid can cause shearing of the damper fluid. The movement of the damper element in the damper housing is dampened in a manner known per se as a result. A corresponding movement of the component is also dampened as a result.

The component may be a flap or cover, for example a glove compartment cover, ashtray cover or mirror cover. It may also be a grab handle or the like. A spring element which biases the damper element in a first moving direction is provided here. The spring element may be arranged within or outside the damper housing. With freedom from forces otherwise being present, said spring element moves the damper element in the first moving direction such that a component which is connected to said damper element is driven together with the damper element by the spring element. During operation, the biasing of the spring element therefore brings about a corresponding movement of the damper element. It is possible here for the spring element to bias the damper element in a first moving direction causing the component to open. The damper element can be moved with regard to the damper housing in particular in two moving directions, wherein a movement in the second moving direction can take place, for example, manually counter to the biasing of the spring element. A component, for example a cover, driven by the spring element can thus be opened and subsequently closed again manually counter to the biasing of the spring element. In order to prevent a subsequent, undesired opening of the component due to the biasing of the spring element, the component may also comprise a releasable locking device which locks the component in a closed position.

According to the invention, a releasable mechanical locking means is provided for the damper. With the spring element already biased, said locking means prevents movement of the damper element at least in the first moving direction thereof, i.e. the moving direction in which the spring element, owing to the biasing thereof, would move the damper element. As a result, it is possible to preassemble the spring element in the biased state even as the damper is being assembled and prior to installation on a component. The spring element can subsequently not be released from the biased state unless the mechanical locking is released. For example, after the damper has been mounted on the component, the mechanical locking can be released such that the biasing of the spring element can act on the damper element and the damper element and therefore the component achieve their full freedom of movement. The damper is then ready to be used for the practical use. The mounting of the damper is thereby considerably simplified since the spring element does not have to be biased in a complicated manner only as the damper is being fitted manually to the component. On the contrary, the biasing can already take place during the assembly of the damper. Of course, it is also possible for the mechanical locking means to inhibit a movement of the damper element in both moving directions.

According to one refinement, the damper element can be rotatable with regard to the damper housing and the damper element can be biased into a first rotational direction by the spring element. In this refinement, the damper element can be rotatable in particular in two opposite rotational directions. The damper element is coupled here to the component in such a manner that, upon rotation of the damper element, a corresponding rotation of the component, for example a pivoting movement of the component, takes place. The damper can then be installed, for example, in the component in such a manner that the axis of rotation of the damper element is arranged coaxially with respect to a pivot axis of the component, for example with respect to a pivotable flap. According to another refinement in this regard, the spring element can be a rotational spring which is fixed with its one end on the damper housing and with its other end on the damper element. The biasing of the damper element can be produced in a simple manner by rotation of the spring. According to another, particularly practical refinement, the damper element may be a rotary piston being rotatable in the damper housing. The damper housing may delimit, for example, a substantially cylindrical cavity in which a rotary piston which is likewise substantially cylindrical is rotatably mounted.

According to another refinement, the mechanical locking may be releasable through a forced movement of the damper element with regard to the damper housing. The forced movement may take place in particular in the first moving direction, for example a first rotational direction. Said forced movement for releasing the mechanical locking may also be produced by a corresponding forced movement of the component with the damper already installed on the component. The damper can thus first of all be mounted on the component with mechanical locking, wherein the mechanical locking is subsequently released manually by a forced movement of the component, for example opening of a flap.

The mechanical locking may be located in the damper housing. However, it is also possible for the mechanical locking to be located outside the damper housing. According to another refinement, the mechanical locking can comprise at least one predetermined breaking region which is breakable for releasing the mechanical locking. For example, a shearing surface may be provided, at which part of the mechanical locking is sheared off or torn off during a forced movement of the damper element. Such a refinement is particularly simple to realize in terms of production. If the mechanical locking is located here within the damper housing, part of the mechanical locking can remain within the damper housing if it is ensured that said part does not undesirably influence the movement of the damper element. If, by contrast, the mechanical locking is located outside the damper housing, part of the mechanical locking can drop off from the damper to the outside.

According to another refinement, the mechanical locking can comprise at least one connection with an outer surface of the damper element and/or an inside of the damper housing, wherein the connection is broken upon a forced movement of the damper element with regard to the damper housing. A connection of this type may exist, for example, between a front end of a rotary piston and an associated front inner wall of the damper housing. According to another refinement, it is also possible for the mechanical locking to comprise at least one connection with an outer surface of the damper element and/or an outer surface of the damper housing, wherein the connection is broken upon a forced movement of the damper element with regard to the damper housing. In both refinements mentioned above, the respective connection may be a form-fitting connection or material bonding connection. In particular if the damper is produced from plastic, for example within the framework of a plastics injection molding process, a connection of this type is particularly simple to produce.

According to another refinement, the mechanical locking can comprise a locking connection which is releasable from its locking for releasing the mechanical locking. If such a locking or snap-in connection is provided, sheared-off parts of a mechanical locking means cannot remain behind in or on the damper. The locking connection can be configured in such a manner that, once released, it cannot be relocked during operation of the damper. For this purpose, the locking connection or a locking arc can be movable beyond a dead center, thus permanently releasing the system. The prevention of relocking of the locking connection during operation of the damper can be achieved by suitable selection of the wall thicknesses of the locking or snap-in connection which is produced, for example, from a plastic.

Figure 10:
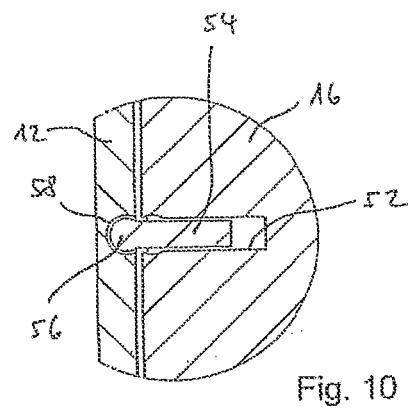
Figure 11:
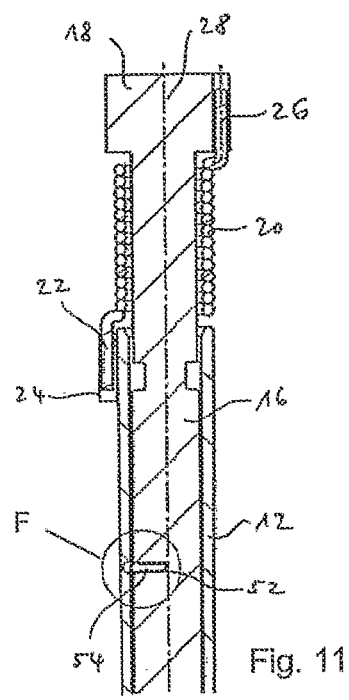
Figure 12:
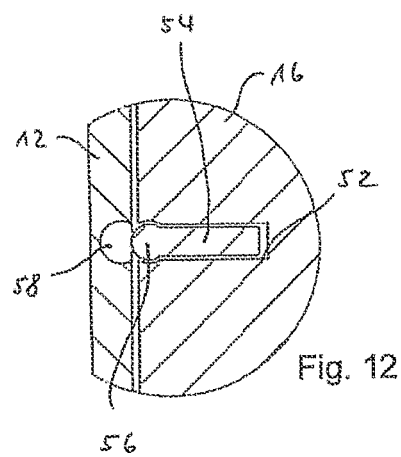

An exemplary embodiment of the invention is explained in more detail below with reference to figures, in which, schematically:

FIG. 1 shows, in a side view, a first exemplary embodiment of a damper according to the invention, FIG. 2 shows an enlarged and partially sectioned view of the detail A from FIG. 1, FIG. 3 shows, in a perspective side view, a second exemplary embodiment of a damper according to the invention, FIG. 4 shows an enlarged view of the detail B from FIG. 3, FIG. 5 shows, in a perspective side view, a third exemplary embodiment of a damper according to the invention in a first operating position, wherein the spring element is not illustrated for reasons of clarity, FIG. 6 shows an enlarged view of the detail C from FIG. 5, FIG. 7 shows, in a perspective side view, the damper from FIG. 5 in a second operating position, wherein the spring element is not illustrated for reasons of clarity, FIG. 8 shows an enlarged view of the detail D from FIG. 7, FIG. 9 shows a sectional view of a fourth exemplary embodiment of a damper according to the invention in a first operating position, FIG. 10 shows an enlarged view of the detail E from FIG. 9, FIG. 11 shows a sectional view of the damper from FIG. 9 in a second operating position, and FIG. 12 shows an enlarged view of the detail F from FIG. 11.

Unless otherwise stated, the same reference numbers in the figures refer to identical objects. FIGS. 1 and 2 show a damper according to the invention for dampening the movement of a component, for example a cover provided in the interior of an automobile. The damper has a damper housing 12 which, in the present example, is substantially cylindrical. Said damper housing 12 bounds a likewise substantially cylindrical cavity in which a damper fluid, for example a silicone fluid, is located. At its front end, the damper housing 12 has a lug 14 with which the damper can be installed in a component in a manner secure against rotation. The damper furthermore has a damper element 16, in the present case a substantially cylindrical rotary piston 16 located partially within the damper housing 12. At its end remote from the damper housing 12, the rotary piston 16 has a form-fitting head 18 which is likewise used for the mounting on the component. The rotary piston 16 is mounted rotatably within the damper housing 12. The damper furthermore has a spring element 20, in the present case a rotational spring 20. The rotational spring 20 is fastened with its one end 22 to a holder 24 of the damper housing 12. The holder 24 is located at that end of the damper housing 12 which is remote from the lug 14. With its other end 26, the rotational spring 20 is fastened in a corresponding receptacle on the head 18 of the rotary piston 16. The rotational spring 20 thereby surrounds the rotary piston 16 in the section thereof which is arranged outside the damper housing 12 as far as the head 18. In the example shown in FIG. 1, the rotational spring 20 is biased in such a manner that, if released, said rotational spring would rotate the rotary piston 16 in a first rotational direction with regard to the damper housing 12. In the installed state of the damper, said rotational movement of the rotary piston 16 is transferred to the corresponding component. If the component is, for example, a pivotable flap, the rotational movement of the rotary piston 16 in the first rotational direction can correspondingly cause the flap or cover to pivot into the open position. It is possible for this purpose in a particularly simple manner to mount the damper on the component such that the axis of rotation (shown schematically at the reference number 28) of the rotary piston 16 runs coaxially with respect to a pivot axis of the component, for example with respect to a cover. From the opened state of the cover, the latter can be closed again manually. In the process, the rotary piston 16 is rotated in the second rotational direction thereof, with the rotational spring 20 being biased again. Suitable latching means which, in the latched state, prevent reopening of the cover due to the biasing of the spring element 20 can be provided on the component.

As mentioned, from the biased state shown in FIG. 1, the rotational spring 20 would basically rotate the rotary piston 16 in a first rotational direction, in which case the rotational spring 20 would be released. This is prevented in the present case by a mechanical locking means which will be explained in more detail with reference to the enlarged detail in FIG. 2. FIG. 2 illustrates the lower section of the damper in a sectional view. A locking connection 30 which prevents an axial movement of the rotary piston 16 within the rotary housing 12 can first of all be seen. Secondly, it can be seen that the rotary piston 16 has a locking section 32 at its distal end. In the example shown, said locking section 32 is connected via a form-fitting connection 34 to the inner wall of the damper housing 12. In the state shown in FIG. 2, this prevents the rotary piston 16 from rotating with regard to the damper housing 12. The securing section 32 is connected here to the rotary piston 16 along a predetermined breaking region 36. If a forced movement of the rotary piston 16 takes place, in the present case a forced rotation, for example by means of a corresponding forced movement of the associated component, the locking section 32 tears off from the rotary piston 16 along the predetermined breaking region 36. The rotary piston 16 is subsequently freely rotatable in the damper housing 12 such that the biasing of the rotational spring 20 can cause a corresponding rotational movement of the rotary piston 16 and therefore a corresponding movement of the component. In the example shown, the locking section 32 can remain within the damper housing 12.

Further exemplary embodiments of the damper according to the invention will be explained with reference to FIGS. 3 to 12. Said dampers correspond in the basic construction thereof substantially to the damper shown in FIGS. 1 and 2. Therefore, said basic construction will not be explained again. However, said dampers differ with regard to the mechanical locking thereof, as is explained in more detail below.

FIGS. 3 and 4 show a second exemplary embodiment of a damper according to the invention. In contrast to the damper from FIGS. 1 and 2, in the case of the damper according to this exemplary embodiment, a mechanical locking means is provided outside the damper housing 12. In particular, the damper according to FIGS. 3 and 4 has a locking pin 38 which is accommodated in a corresponding recess 40 of the damper housing 12. An extension 42 extending at right angles from the locking pin 38 in the direction of the rotary piston 16 is formed on said locking pin at the end thereof which is remote from the damper housing 12. The extension 42 is connected to the outer surface of the rotary piston 16 via a form-fitting connection 44. Said connection 44 forms a predetermined breaking region.

If, from the biased state of the spring 20 shown in FIGS. 3 and 4, a forced movement of the rotary piston 16 with regard to the damper housing 12 is produced, the extension 42 of the locking pin 38 tears off from the rotary piston 16 along the predetermined breaking region 44. The rotary piston 16 in turn is subsequently freely rotatable in the damper housing 12. The locking pin 38 including the extension 42 thereof can drop off from the damper to the outside.

FIGS. 5 to 8 show a third exemplary embodiment of a damper according to the invention. FIGS. 5 and 6 show a first operating position and FIGS. 7 and 8 show a second operating position of the damper. The rotational spring 20 is not shown here in order to illustrate the mechanical locking. The function of said rotational spring is identical to the rotational spring 20 shown in FIGS. 1 to 4. In the exemplary embodiment according to FIGS. 5 to 8, a locking element 46 is provided at that end of the damper housing 12 which is remote from the lug 14. It can be seen in particular in the enlarged illustrations of FIGS. 6 and 8 that that side of the locking element 46 which faces the rotary piston 16 has a recess 48 which, in the example shown, is approximately semicircular in cross section. The outer side of the rotary piston 16 has a locking projection 50 which corresponds to the locking recess 48 and, in the example shown, is likewise approximately semicircular in cross section. Of course, differently shaped recesses and locking projections are also possible. In the operating state of said damper shown in FIGS. 5 and 6, the locking projection 50 is locked in the locking recess 48. This initially prevents rotation of the rotary piston 16 with regard to the damper housing 12. In this state, the rotational spring 20, which is installed with biasing, therefore cannot rotate the rotary piston 16 with regard to the damper housing 12. If the rotary piston 16 is now forcibly rotated with regard to the damper housing 12, for example by means of a corresponding forced movement of the associated component, the locking projection 50 is released from the locking recess 48, as shown in FIGS. 7 and 8. The locking element 46 is pressed outward. The locking or snap-in connection between the projection 50 and the recess 48 including the locking element 46 is configured here in such a manner that, after release from the locking connection, the projection 50 cannot lock again into the recess 48 during the subsequent operation of the damper. In the state shown in FIGS. 7 and 8, the rotary piston 16, driven, for example, by the rotational spring 20, is freely rotatable with regard to the damper housing 12.

A fourth exemplary embodiment of a damper according to the invention will be explained with reference to FIGS. 9 to 12. FIGS. 9 and 10 show a first operating position and FIGS. 11 and 12 show a second operating position of the damper. The rotary piston 16 here has a substantially cylindrical recess 52 in its section arranged within the damper housing 12. A locking pin 54 which is likewise substantially cylindrical is arranged movably in the radial direction in said recess. The outer end of the pin 54 facing the damper housing 12 has an expanded portion 56 which is substantially spherical in the example shown. The inner surface of the damper housing 12 has a corresponding recess 58 which, in the example shown, is substantially spherical and, when the damper is mounted, lies opposite the radial recess 52 of the rotary piston 16. Of course, differently shaped expanded portions and recesses are also possible. In the mounted state of the damper shown in FIGS. 9 and 10 and with the rotational spring 20 biased, the locking pin 54 is locked by the spherical expanded portion 56 thereof in the corresponding recess 58 of the damper housing 12. This prevents rotation of the rotary piston 16 within the damper housing 12, said rotation otherwise being produced by the biasing of the rotational spring 20. If a forced rotation of the rotary piston 16 now takes place within the damper housing 12, for example by means of a corresponding forced movement of a component provided with the damper, the locking pin 54 is pressed out of the recess 58 into the radial recess 52 of the rotary piston 16. Said released state of the mechanical locking is shown in FIGS. 11 and 12. In said state, rotation of the rotary piston 16 within the damper housing 12 is possible again.

The invention claimed is:

1. Damper for dampening the movement of a component, comprising a damper housing and a damper element being located at least partially within the damper housing and being moveable with regard to the damper housing, and a spring element being in operational connection with the damper element and biasing the damper element in a first moving direction, characterized in that mechanical locking means are provided which inhibit a movement of the damper element with regard to the damper housing at least in the first moving direction when the spring element is biased, and in that the mechanical locking means are releasable,
wherein the mechanical locking comprises at least one predetermined breaking region which is breakable for releasing the mechanical locking.

2. Damper according to claim 1, wherein the mechanical locking is releasable through a forced movement of the damper element with regard to the damper housing.

3. Damper according to claim 2, wherein the mechanical locking comprises at least one of a connection with an outer surface of the damper element or an inside of the damper housing, wherein the connection is broken upon a forced movement of the damper element with regard to the damper housing.

4. The damper according to claim 2, wherein the mechanical locking comprises a connection with an outer surface of the damper element, wherein the connection is broken upon a forced movement of the damper element with regard to the damper housing.

5. The damper according to claim 2, wherein the mechanical locking comprises a connection with an inside surface of the damper housing, wherein the connection is broken upon a forced movement of the damper element with regard to the damper housing.

6. The damper according to claim 2, wherein the mechanical locking comprises a connection with an outer surface of the damper element and an inside surface of the damper housing, wherein the connection is broken upon a forced movement of the damper element with regard to the damper housing.

7. Damper according to claim 1, wherein the mechanical locking is located in the damper housing.

8. Damper according to claim 1, wherein the mechanical locking is located outside the damper housing.

9. Damper according to claim 1, wherein the mechanical locking comprises a locking connection, which is releasable from its locking for releasing the mechanical locking and can subsequently not be relocked.

10. Damper according to claim 1, wherein the damper element is rotatable with regard to the damper housing and the damper element is biased into a first rotational direction by the spring element.

11. Damper according to claim 10, wherein the spring element is a rotational spring which is fixed with its one end on the damper housing and with its other end on the damper element.

12. Damper according to claim 10, wherein the damper element is a rotary piston being rotatable in the damper housing.

13. Damper according to claim 1, wherein in the damper housing a damper medium, in particular a damper fluid, is provided.

14. The damper according to claim 13, wherein the damper fluid is in contact with an inner surface of the housing.

15. A damper configured to dampen the movement of an interior component in the interior of an automobile, the damper comprising:
a damper housing;
a damper element located at least partially within the damper housing;
a spring element being in operational connection with the damper element; and
a mechanical lock;
wherein the damper element is a rotary piston configured to rotate within the damper housing, the spring element is configured to bias the damper element in a first moving direction, the mechanical lock is configured to inhibit a movement of the damper element relative to the damper housing in the first moving direction when the spring element is biased, and the mechanical lock is releasable;
wherein the mechanical lock comprises at least one predetermined breaking region which is breakable for releasing the mechanical lock.

16. The damper according to claim 15, wherein the mechanical lock is releasable through a forced movement of the damper element with regard to the damper housing.

17. The damper according to claim 16, wherein the mechanical locking comprises a connection with an outer surface of the damper element, wherein the connection is broken upon a forced movement of the damper element with regard to the damper housing.

18. The damper according to claim 16, wherein the mechanical locking comprises a connection with an inside surface of the damper housing, wherein the connection is broken upon a forced movement of the damper element with regard to the damper housing.

19. The damper according to claim 16, wherein the mechanical locking comprises a connection with an outer surface of the damper element and an inside surface of the damper housing, wherein the connection is broken upon a forced movement of the damper element with regard to the damper housing.

20. The damper according to claim 15, wherein damper fluid is provided within the housing, the fluid being in contact with an inner wall of the housing.

21. Damper for dampening the movement of a component, comprising a damper housing and a damper element being located at least partially within the damper housing and being moveable with regard to the damper housing, and a spring element being in operational connection with the damper element and biasing the damper element in a first moving direction,
wherein a mechanical locking arrangement is provided configured to inhibit a movement of the damper element with regard to the damper housing at least in the first moving direction when the spring element is biased, and in that the mechanical locking arrangement is releasable to permit movement in the at least first moving direction, and
wherein the locking arrangement comprises at least one predetermined breaking region which is breakable for releasing the mechanical locking arrangement.

22. The damper according to claim 21, wherein the locking arrangement includes a component of the damper element and a component of the housing, wherein the component of the damper element is in direct contact with the component of the housing.

23. The damper according to claim 21, wherein the locking arrangement is exposed to a damper medium.

24. The damper according to claim 21, wherein the housing and the damper element are directly exposed to a damper medium.

* * * * *